US011858269B2

(12) United States Patent
Martin et al.

(10) Patent No.: US 11,858,269 B2
(45) Date of Patent: Jan. 2, 2024

(54) CAVITATION PLATE TO PROTECT A HEATING COMPONENT AND DETECT A CONDITION

(71) Applicant: Hewlett-Packard Development Company, L.P., Spring, TX (US)

(72) Inventors: Eric Thomas Martin, Corvallis, OR (US); Tsuyoshi Yamashita, Corvallis, OR (US); Vincent C. Korthuis, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 39 days.

(21) Appl. No.: 17/434,780

(22) PCT Filed: Jun. 17, 2019

(86) PCT No.: PCT/US2019/037491
§ 371 (c)(1),
(2) Date: Aug. 30, 2021

(87) PCT Pub. No.: WO2020/256689
PCT Pub. Date: Dec. 24, 2020

(65) Prior Publication Data

US 2022/0134745 A1 May 5, 2022

(51) Int. Cl.
*B41J 2/14* (2006.01)
*B41J 2/16* (2006.01)

(52) U.S. Cl.
CPC ....... *B41J 2/14129* (2013.01); *B41J 2/14112* (2013.01); *B41J 2/14153* (2013.01); *B41J 2/14032* (2013.01); *B41J 2/14072* (2013.01); *B41J 2/1601* (2013.01); *B41J 2/164* (2013.01)

(58) Field of Classification Search
CPC ................ B41J 2/14129; B41J 2/14112; B41J 2/14153; B41J 2/14032; B41J 2/14072; B41J 2/1601; B41J 2/164
See application file for complete search history.

(56) References Cited

U.S. PATENT DOCUMENTS

| | | | |
|---|---|---|---|
| 4,335,389 | A | 6/1982 | Shirato et al. |
| 4,596,994 | A | 6/1986 | Matsuda et al. |
| 4,965,611 | A | 10/1990 | Pan et al. |
| 5,682,188 | A | 10/1997 | Meyer et al. |

(Continued)

FOREIGN PATENT DOCUMENTS

| | | | |
|---|---|---|---|
| CN | 105939856 | A | 9/2016 |
| EP | 1352744 | A2 | 10/2003 |

(Continued)

*Primary Examiner* — Geoffrey S Mruk
(74) *Attorney, Agent, or Firm* — Foley & Lardner LLP

(57) ABSTRACT

According to examples, an apparatus may include a fluidic chamber, in which fluid is to be temporarily held. The apparatus may also include a heating component to generate heat to form a drive bubble in the fluid held in the fluidic chamber and a cavitation plate may be provided between the fluidic chamber and the heating component. The cavitation plate may be in communication with the fluidic chamber and may physically separate the fluidic chamber from the heating component to protect the heating component. In addition, a controller may determine a condition in the fluidic chamber based on an electrical signal received from the cavitation plate.

15 Claims, 4 Drawing Sheets

(56) References Cited

U.S. PATENT DOCUMENTS

| | | | |
|---|---|---|---|
| 6,010,201 | A | 1/2000 | Shimoda |
| 6,378,978 | B1 | 4/2002 | Chang et al. |
| 10,589,523 | B2 * | 3/2020 | Anderson ............ B41J 2/04543 |
| 2005/0078151 | A1 | 4/2005 | Bell et al. |
| 2007/0285471 | A1 | 12/2007 | Park et al. |
| 2008/0002000 | A1 | 1/2008 | Cornell et al. |
| 2015/0015632 | A1 | 1/2015 | Sakurai et al. |

FOREIGN PATENT DOCUMENTS

| | | | |
|---|---|---|---|
| EP | 2423948 | A2 | 2/2012 |
| EP | 3468806 | A1 | 4/2019 |
| JP | 08-039829 | A | 2/1996 |
| JP | 2001191532 | A | 7/2001 |
| JP | 2001-232814 | A | 8/2001 |
| JP | 2018-001748 | A | 1/2018 |
| JP | 2019-014264 | A | 1/2019 |
| WO | WO-2015116092 | A1 | 8/2015 |
| WO | WO-2016175740 | A1 | 11/2016 |
| WO | 2018/080479 | A1 | 5/2018 |

* cited by examiner

CAVITATION PLATE TO PROTECT A HEATING COMPONENT AND DETECT A CONDITION

BACKGROUND

Inkjet printers use printing fluid droplets released from a nozzle in a print head onto paper or other print media to record images on the paper or other print media. The nozzles in the print heads of some inkjet printers may be in fluidic communication with fluidic chambers such that printing fluid or other fluid contained in the fluidic chambers may be ejected through the nozzles from the fluidic chambers. In some examples (e.g., thermal ink jet (TIJ) designs), drive bubbles may be formed in the printing fluid or fluid contained in the fluidic chamber.

BRIEF DESCRIPTION OF THE DRAWINGS

Features of the present disclosure are illustrated by way of example and are not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms “a” and “an” are intended to denote at least one of a particular element. As used herein, the term “includes” means includes but not limited to, the term “including” means including but not limited to. The term “based on” means based at least in part on.

Disclosed herein are apparatuses, e.g., fluidic dies, print heads, or other types of apparatuses that may include segmented cavitation plates for fluidic chambers in the apparatuses. Each of the segmented, e.g., individual, cavitation plates may function as a fluidic sensor for a respective fluidic chamber (e.g., nozzle chamber). For instance, the individual cavitation plates may function as sensors that may be implemented to sense the presence of drive bubbles used to propel droplets of fluid, e.g., printing medium, ink, or the like, held in the fluidic chambers. By way of example, the individual cavitation plates may function as impedance sensors in the fluidic chamber to detect characteristics of the fluid during drive bubble formation. In addition to functioning as sensors, the individual cavitation plates may protect underlying thin film layers (e.g., conductive traces, metal layers, insulative layers, oxide layers, and/or the like) susceptible to over-etch during manufacturing processes. Also disclosed herein are fluidic dies, which may be print heads, and methods for fabricating an apparatus that may include the individual cavitation plates.

Through implementation of the apparatuses, fluidic dies, and methods disclosed herein, individual cavitation plates may be provided to both protect underlying thin film layers and to detect conditions, e.g., impedance levels during bubble formation. The individual cavitation plates disclosed herein may afford both the protection and the condition detection and thus, the apparatuses disclosed herein may be fabricated with a fewer number of components, which may reduce complexity and costs associated with the fabrication of the fluidic dies.

Figure 1A:
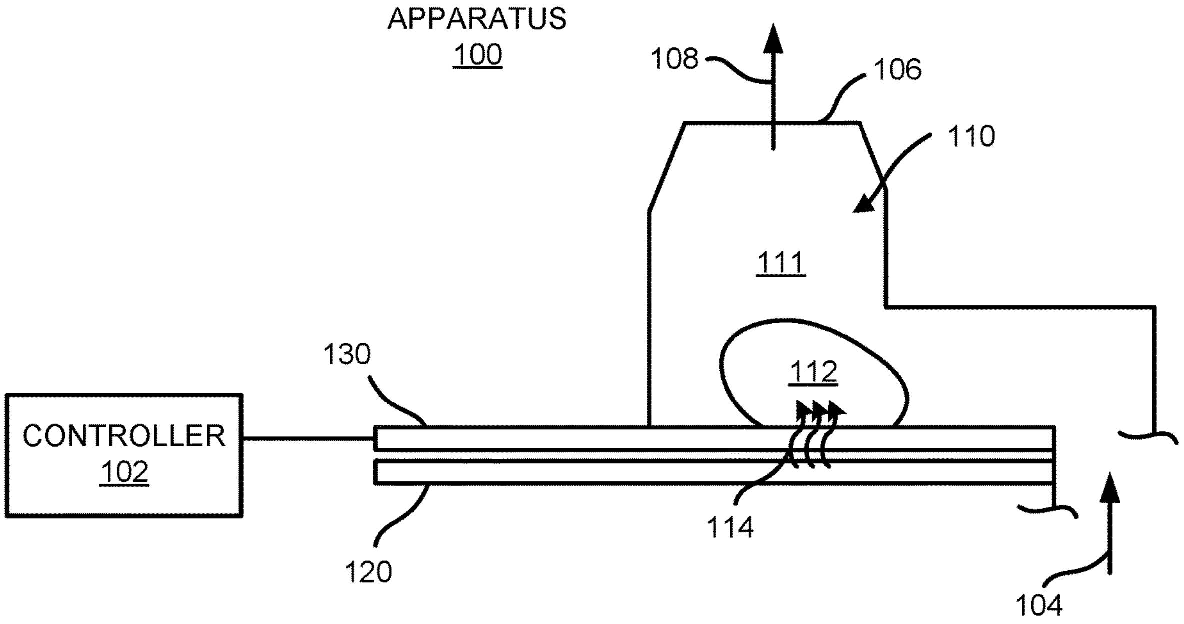
FIGS. 1A and 1B, respectively, depict diagrams of an example apparatus that may include a segmented cavitation plate.
Figure 1B:
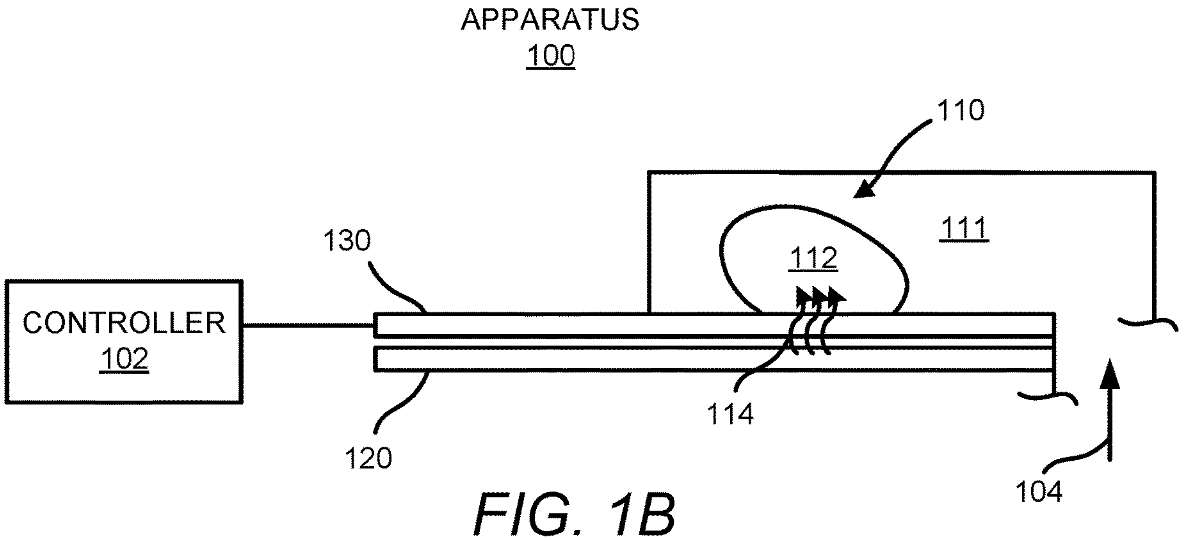
Figure 2:
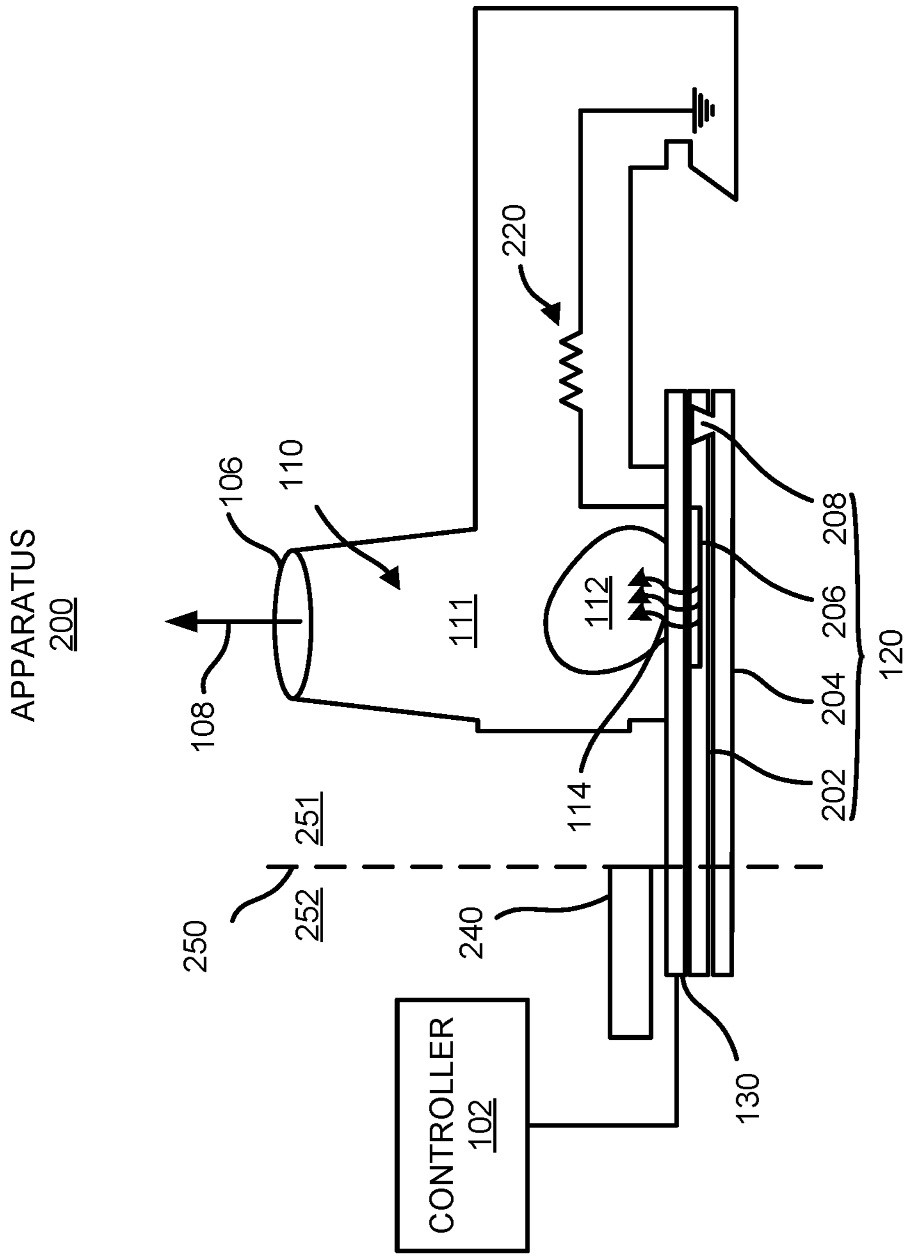
FIG. 2 depicts a diagram of an example apparatus that may include a segmented cavitation plate and a dielectric layer.
Figure 3:
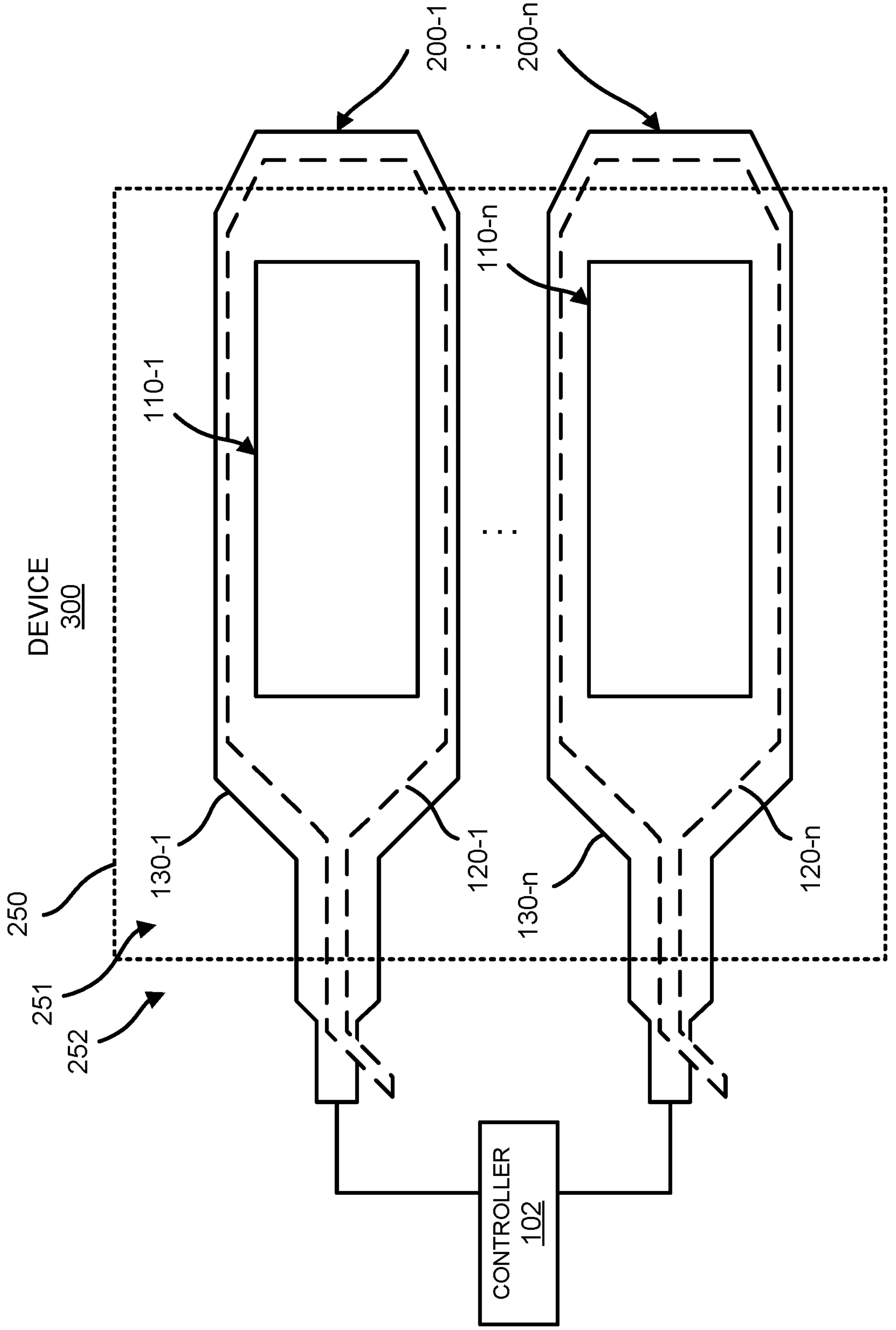
FIG. 3 depicts a diagram of an example device showing a plurality of apparatuses depicted in FIG. 2.

Reference is made to FIGS. 1A-3. FIGS. 1A and 1B, respectively, depict diagrams of an example apparatus 100 that may include a segmented cavitation plate 130. FIG. 2 depicts a diagram of an example apparatus 200 that may include a heating component 120 and a dielectric layer 240. FIG. 3 depicts a diagram of an example device 300 that may include a plurality of the apparatuses 200 depicted in FIG. 2. It should be understood that the apparatus 100 depicted in FIGS. 1A and 1B, the apparatus 200 depicted in FIG. 2, and/or the device 300 depicted in FIG. 3 may include additional features and that some of the features described herein may be removed and/or modified without departing from scopes of the present disclosure.

In the examples illustrated in FIGS. 1A-3, the apparatus 100 is described with respect to a single fluidic chamber 110 and other components (as shown in FIGS. 1A and 1B) and the apparatuses 200, 300 are described with respect to multiple fluidic chambers 110-1 to 110-*n* and other components (as shown in FIGS. 2 and 3). The descriptions of the apparatuses 100-300 and the methods of the present disclosure make reference to particular types of printers, such as inkjet printers. However, it should be appreciated that other examples are envisioned in the present disclosure, for example, implementation of multiple controllers 102 to control different arrays of fluidic dies, e.g., print heads, or other types of devices, implementation on two-dimensional (2D) or three-dimensional (3D) print applications, microfluidic die applications, bio applications, lab-on-a-chip (LOC), and/or other types of applications.

According to examples, and a shown in FIGS. 1A-2, the apparatus 100 may include a fluidic chamber 110, a heating component 120, and a cavitation plate 130. A fluid 111, which may be ink, a chemical, or other type of fluid, may be temporarily held in the fluidic chamber 110. For instance, the fluid 111 may be delivered into the fluidic chamber 110 from a reservoir (not shown) as denoted by the arrow 104 and may be expelled from the fluidic chamber 110 through a nozzle 106 as denoted by the arrow 108. Thus, the fluid 111 may temporarily be held in the fluidic chamber 110 prior to the fluid 111 being expelled through the nozzle 106.

In operation, the heating component 120 may generate heat to form a drive bubble 112 in the fluid 111 held in the fluidic chamber 110. As also discussed herein, the heating component 120 may be a thin film layer formed of a resistive element 206 coupled to a conductive layer 202, 204. An electric current may be applied through the resistive element 206 from the conductive layer 202, 204, which may cause the resistive element 206 to become heated. The generated heat may flow through the cavitation plate 130 and into the fluidic chamber 110 as denoted by the arrows 114. In instances in which fluid 111 is held in the fluidic chamber 110, the heat may vaporize some of the fluid 111, which may cause the drive bubble 112 to be formed. The drive bubble 112 may be formed rapidly, causing the pressure within the fluidic chamber 110 to rapidly increase. The rapid increase in pressure may cause some of the fluid 111 to move out of the fluidic chamber 110, e.g., expelled through the nozzle 106 as a droplet of the fluid 111.

According to examples, electric current may be applied to the resistive element 206 in the heating component 120 for a relatively short duration of time, e.g., for a fraction of a second. Following the cessation of the electric current application, the drive bubble 112 may dissipate. As the drive bubble 112 dissipates, the pressure level inside the fluidic chamber 110 may become lower, which may cause fluid 111 to be drawn into the fluidic chamber 110 from the reservoir as denoted by the arrow 104.

As shown in FIG. 1A, the cavitation plate 130 may be provided between the fluidic chamber 110 and the heating component 120 to protect the heating component 120 from, for instance, the forces caused by the formation and collapse of the drive bubble 112. The cavitation plate 130 may also protect the heating component 120 during a fabrication process of the apparatus 100. The cavitation plate 130 may be in communication with the fluidic chamber 110 and may physically separate the heating component 120 from the fluidic chamber 110 such that no section of the heating component 120 is exposed to the fluidic chamber 110. In some examples, a portion of the cavitation plate 130 may be positioned in the fluidic chamber 110, in physical contact with the fluid 111, and may function as a "floor" for the fluidic chamber 110.

In addition, the cavitation plate 130 may be electrically isolated from the heating component 120. For instance, the cavitation plate 130 may be physically separated from the heating component 120 and/or an electrically insulative material may be provided between the cavitation plate 130 and the heating component 120 such that electric current may not be conducted from the conductive layer 202, 204 and/or the resistive element 206 to the cavitation plate 130 and vice versa. The cavitation plate 130 may also be implemented as a sensor, e.g., an impedance sensor, to detect a condition in the fluidic chamber 110 during or after generation of the drive bubble 112.

According to examples, a controller 102 may be electrically connected to the cavitation plate 130 and the controller 102 may detect an electrical signal from the cavitation plate. That is, for instance, the controller 102 may cause an electric current to be applied across the cavitation plate 130 and through the fluid 111, which may have a resistive component 220, as shown in FIG. 2. The controller 102 may detect an electrical signal level through the cavitation plate 130 and may determine the condition, e.g., impedance, in the fluidic chamber 110 according to a value, e.g., strength, resistance, or the like, of the detected electrical signal. According to examples, a plurality of fluidic chambers 110 may be provided, and the cavitation plate 130 may be segmented into a plurality of electrically isolated plates that function as sensors for respective fluidic chambers 110.

According to examples, the apparatus 100 may be a fluidic die, such as a print head. In these examples, the heating component 120 may cause fluid 111 to be ejected through the nozzle 106 as droplets. The apparatus 100 may be part of a two-dimensional printer that may deposit droplets of the fluid 111 onto a print media, such as paper. Alternatively, the apparatus 100 may be part of a three-dimensional (3D) printer that may deposit droplets of the fluid 111 onto build material particles during a 3D printing operation.

In other examples, and as shown in FIG. 1B, the apparatus 100 may function as a fluidic pump that may move fluid 111 from one location to another, e.g., without causing the fluid 111 to be ejected from the apparatus 100 through a nozzle 106. For instance, the apparatus 100 may have a u-fluidic pump architecture. In examples in which the apparatus 100 is to function as a fluidic pump as shown in FIG. 1B, the apparatus 100 may not include a nozzle 106. Instead, the expansion of the drive bubble 112 may not cause some of the fluid 111 to be ejected from the fluidic chamber 110, but may cause fluid 111 within the fluidic chamber 110 to be displaced within the fluidic chamber 110 and/or a channel in fluidic communication with the fluidic chamber 110.

Referring to FIG. 2, an apparatus 200 may include similar components as the apparatus 100 depicted in FIG. 1A. The apparatus 200 is depicted as, however, including additional components. The common components depicted in FIG. 2 are not described in detail and instead, the descriptions of these components with respect to FIG. 1A is relied upon to describe the common components of FIG. 2. Alternatively, it should be understood that the apparatus 200 may instead include the features shown in FIG. 1B.

As shown in FIG. 2, the heating component 120 may be a thin film layer and may include the conductive layers 202, 204 and the resistive element 206. The resistive element 206 may include a resistor or multiple resistors and may receive electric current that may flow through the conductive layers 202, 204. In this regard, the resistive element 206 may be electrically coupled to a conductive layer 202 and/or 204. In some examples, the conductive layers 202, 204 may be made of metal, such as copper, silver, gold, and/or the like, and may be formed as conductive traces. Electric current may be applied into one of the conductive layers 202 and may flow through the resistive element 206 as the electric current flows out of the other conductive layer 204. As discussed above, as current is applied through the resistive element 206 via the conductive layers 202, 204, the resistive element 206 may become heated, which may cause some of the fluid 111 in the fluidic chamber 110 to vaporize, which in turn may cause formation of the drive bubble 112. Although not shown, an insulation layer may electrically isolate the conductive layers 202 and 204, and the conductive layers 202 and 204 may be electrically connected by a connection 208 (e.g., a via) to form a return path for the current.

A dielectric layer 240 (e.g., thin film layer formed of TetraEthyl OrthoSilicate (TEOS), or the like) may be provided over portions of the cavitation plate 130 and the heating component 120, or other underlying thin film layers as illustrated in FIG. 2. The dielectric layer 240 may protect the portions of the cavitation plate 130 and the heating component over which the dielectric layer 240 is provided. For proper operation of the heating components 120 and cavitation plate 130, the dielectric layer 240 may not be provided in regions corresponding to the fluidic chamber 110. For example, as depicted in FIG. 2, a boundary between a protected region 252 and an unprotected region 251 is represented by a dotted line 250, and the dielectric layer 240 may be provided in the protected region 252 without extending into the unprotected region 251.

The heating component 120 may include a first portion located in the unprotected region 251 and a second portion located in the protected region 252. As such, the dielectric layer 240 may not cover the underlying thin film layers (e.g., conductive layer 202 and/or resistive element 206) located in the unprotected region 251. In some examples as described herein, the cavitation plate 130, which is disposed over the portions of the heating component 120 that may not be protected by the dielectric layer 240, may cover the underlying conductive layers 202, 204 (e.g., conductive layer 202 and/or resistive element 206) in the unprotected region 251.

FIG. 3 depicts a diagram of an example device 300 that may include a plurality of the apparatuses 200-1 to 200-*n* depicted in FIG. 2, in which the variable "n" may represent a value greater than one. FIG. 3 shows a top view of the apparatuses 200-1 to 200-*n*. As shown, each of the apparatuses 200-1 to 200-*n* may be physically separate from each other, and may include respective cavitation plates 130-1 to 130-*n*. In this regard, the cavitation plates 130-1 to 130-*n* may be segmented with respect to each other. In addition, each of the apparatuses 200-1 to 200-*n* may have the same components. For example, a cavitation plate 130-1 of one of the apparatuses 200-1 and a cavitation plate 130-*n* of another one of the apparatuses 200-*n* may have the same structure, and may be coplanar to each other, e.g., formed from the same tantalum layer. Furthermore, each of the plurality of cavitation plates 130-1 to 130-*n* may overlap a corresponding one of the plurality of heating components 120-1 to 120-*n* as shown. There may be an interest in a structural arrangement of cavitation plates 130-1 to 130-*n* overlapping heating components 120-1 to 120-*n*. Indeed, a unitary cavitation plate extending across and covering multiple underlying heating components may be undesirable, such as due to potential parasitic capacitance.

Referring again to FIG. 3, the plurality of cavitation plates 130-1 to 130-*n* may be disposed to protect the underlying heating components 120-1 to 120-*n*. Particularly, the cavitation plates 130-1 to 130-*n* may be formed to overlap the heating components 120-1 to 120-*n* in the unprotected region 251. For example, in the unprotected region 251 where the dielectric layer 240 is not provided, the cavitation plates 130-1 to 130-*n* may be patterned to fully overlap portions of the underlying heating components 120-1 to 120-*n*. The shapes of the cavitation plates 130-1 to 130-*n* may be formed to have shapes similar to those of the underlying conductive layers 202, 204.

In some examples, a first portion of the heating components 120-1 to 120-*n* which are disposed in the unprotected region 251 may have a prescribed width and the cavitation plates 130-1 to 130-*n* which are disposed in the unprotected region 251 may have a width greater than the width of the first portion of the heating components 120-1 to 120-*n*. In some examples, the cavitation plates 130-1 to 130-*n* may also cover sides of the heating components 120-1 to 120-*n*. For example, to ensure acceptable performance of the cavitation plates 130-1 to 130-*n* as sensors, parasitic capacitance of the sensor nodes may be minimized (e.g., by minimizing area). As such, overlapping of the heating components 120-1 to 120-*n* by the cavitation plates 130-1 to 130-*n* may be designed to be a minimum amount to sufficiently protect the heating components 120-1 to 120-*n* from over-etch, while maintaining sensor performance of the cavitation plates 130-1 to 130-*n*. The shapes and widths of the heating components 120-1 to 120-*n* and the cavitation plates 130-1 to 130-*n* may enable minimum overlapping and/or enclosure of the heating components 120-1 to 120-*n* while maintaining a desired level of sensor performance of the cavitation plates 130-1 to 130-*n*.

Figure 4:
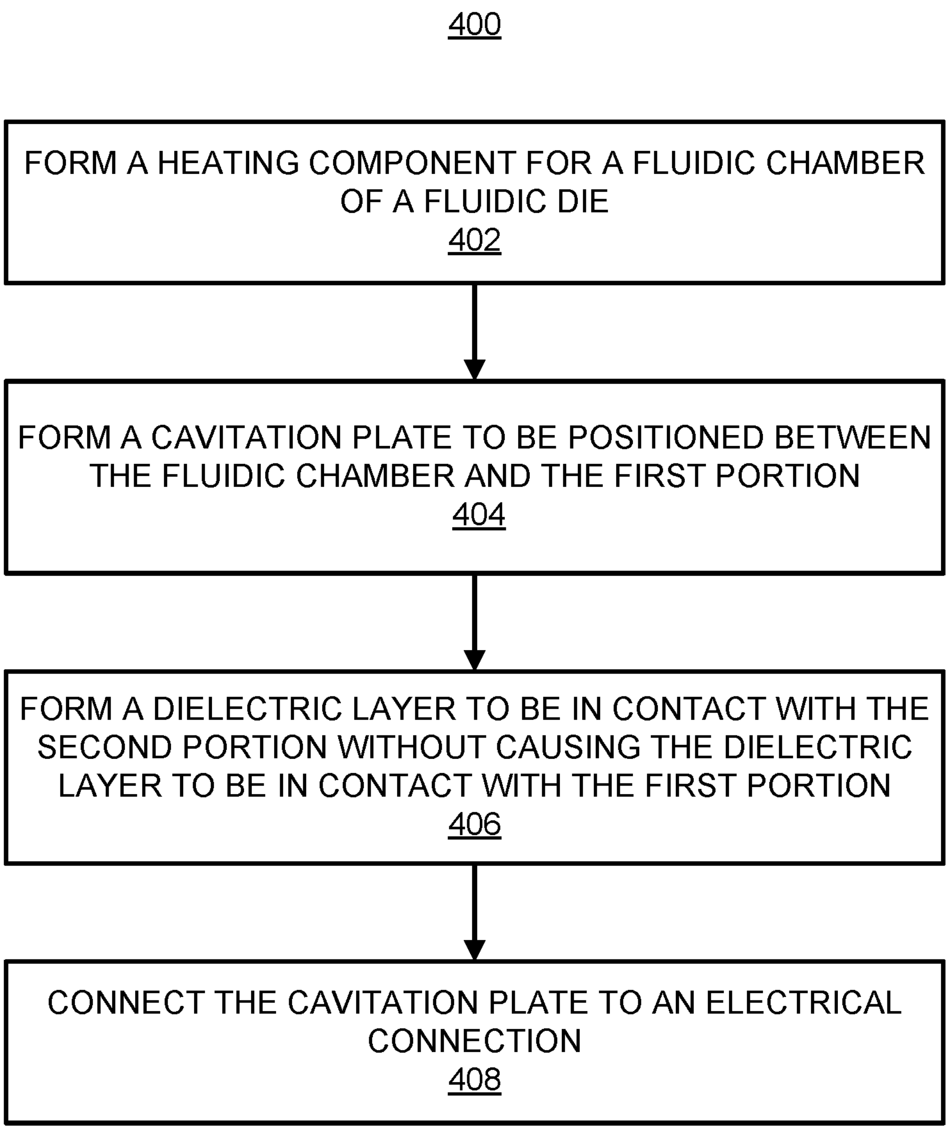
FIG. 4 shows a flow diagram of an example method for forming a singulated cavitation plate.

Various manners in which the apparatuses 100, 200, 300 may be formed are discussed in greater detail with respect to the method 400 depicted in FIG. 4. Particularly, FIG. 4 shows a flow diagram of an example method 400 for forming an apparatus 100, 200, 300 having a singulated cavitation plate 130. It should be understood that the method 400 depicted in FIG. 4 may include additional operations and that some of the operations described therein may be removed and/or modified without departing from the scope of the method 400. The descriptions of the method 400 are made with reference to the features depicted in FIGS. 1A-3 for purposes of illustration.

At block 402, a heating component 120 for a fluidic chamber 110 of a fluidic die, such as a print head, may be formed. The heating component 120 may have a first portion adjacent to the fluidic chamber 110 and a second portion that is offset from the fluidic chamber 110. The first portion may be disposed in the unprotected region 251 and the second portion may be disposed in the protected region 252.

At block 404, a cavitation plate 130 may be formed. The cavitation plate 130 may be positioned between the fluidic chamber 110 and the first portion of the heating component 120 in the unprotected region 251.

At block 406, a dielectric layer 240 may be formed. The dielectric layer 240 may be in contact with the heating component 120 and/or the cavitation plate 130 in the protected region 252 without causing the dielectric layer 240 to be in contact with the portion of the heating component 120 and/or the cavitation plate 130 in the unprotected region 251.

At block 408, the cavitation plate 130 may be connected to an electrical connection. The cavitation plate 130 may be coupled to a controller 102, in which the controller 102 may determine a condition in the fluidic chamber 110 based on an electrical signal received from the cavitation plate 130 as discussed herein. The determined condition may be an electrical property of fluid 111 in a fluidic chamber 110, and more particularly, the electrical property, e.g., impedance, of the fluid 111 during formation of a drive bubble 112 in the fluidic chamber 110.

In some examples, forming the heating component 120 may include forming a plurality of heating components 120-1 to 120-*n* for a plurality of fluidic chambers 110-1 to 110-*n* of a fluidic die. In addition, forming the cavitation plate may include forming a plurality of cavitation plates 130-1 to 130-*n* to be positioned between respective fluidic chambers 110-1 to 110-*n* and heating components 120-1 to 120-*n*. Furthermore, each of the plurality of cavitation plates 130-1 to 130-*n* may be formed to overlap a respective heating component 120-1 to 120-*n* of the plurality of heating components 120-1 to 120-*n* in order to provide protection for underlying thin film layers while also functioning as a sensor in the fluidic chamber 110-1 to 110-*n*.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:

a fluidic chamber, wherein a fluid is to be temporarily held in the fluidic chamber;

a heating component to generate heat to form a drive bubble in the fluid held in the fluidic chamber; and a cavitation plate provided between the fluidic chamber and the heating component, the cavitation plate in communication with the fluidic chamber and physically separating the fluidic chamber from the heating component to protect the heating component;

a dielectric layer disposed over a portion of the cavitation plate to protect the portion of the cavitation plate, wherein a controller is to determine a condition in the fluidic chamber based on an electrical signal received from the cavitation plate.

2. The apparatus of claim 1, wherein the condition in the fluidic chamber is a property inside the fluidic chamber during or after generation of the drive bubble in the fluid.

3. The apparatus of claim 1, wherein the heating component includes a metal layer and a resistive element coupled to the metal layer, and wherein the resistive element is to generate heat through receipt of an electric current from the metal layer.

4. The apparatus of claim 3, wherein the metal layer includes a first portion provided in a first region in which the fluidic chamber is located, and a second portion provided in a second region adjacent to the first region, and wherein the cavitation plate overlaps the metal layer in the first region.

5. The apparatus of claim 4, wherein the cavitation plate is provided between the dielectric layer and the metal layer, wherein the dielectric layer overlaps the metal layer in the second region and does not overlap the metal layer in the first region.

6. The apparatus of claim 4, wherein the first portion of the metal layer has a prescribed shape and the cavitation plate has a prescribed shape that corresponds to the prescribed shape of the metal layer.

7. The apparatus of claim 4, wherein the first portion of the metal layer has a prescribed width and the cavitation plate in the first region has a prescribed width greater than the prescribed width of the first portion of the metal layer.

8. The apparatus of claim 1, further comprising:

a second fluidic chamber, wherein the fluid is to be temporarily held in the second fluidic chamber;

a second heating component to generate heat to form a drive bubble in the fluid held in the second fluidic chamber; and a second cavitation plate in communication with the second fluidic chamber, the second cavitation plate being physically separate from the cavitation plate.

9. The apparatus of claim 8, wherein the cavitation plate and the second cavitation plate are coplanar.

10. The apparatus of claim 1, wherein the cavitation plate is formed of tantalum.

11. A print head, comprising:

a plurality of fluidic chambers to temporarily hold fluid;

a metal layer formed of a plurality of heating components, wherein each of the plurality of heating components is to generate heat to form a drive bubble in the fluid held in a respective fluidic chamber of the plurality of fluidic chambers; and a cavitation plate layer provided between the plurality of fluidic chambers and the metal layer, the cavitation plate layer including a plurality of cavitation plates;

a dielectric layer disposed over a portion of the cavitation plate to protect the portion of the cavitation plate, wherein each cavitation plate of the plurality of cavitation plates is in communication with a respective fluidic chamber of the plurality of fluidic chambers and is to be implemented to detect a condition in the respective fluidic chamber.

12. The print head of claim 11, wherein each of the plurality of cavitation plates is physically separate from each other, wherein each of the plurality of heating components is physically separate from each other, and wherein each of the plurality of cavitation plates overlaps a corresponding one of the plurality of heating components of the metal layer.

13. The print head of claim 11, wherein the condition in the respective fluidic chamber detected by each cavitation plate is a property inside the respective fluidic chamber during generation of the drive bubble in the fluid.

14. A method comprising:

forming a heating component for a fluidic chamber of a fluidic die, the heating component having a first portion adjacent to the fluidic chamber and a second portion that is offset from the fluidic chamber;

forming a cavitation plate to be positioned between the fluidic chamber and the first portion;

forming a dielectric layer over a portion of the capitation plate, the dielectric layer to be in contact with the second portion of the heating component without causing the dielectric layer to be in contact with the first portion of the heating component; and connecting the cavitation plate to an electrical connection, wherein the cavitation plate is coupled to a controller, wherein the controller is to determine a condition in the fluidic chamber based on an electrical signal received from the cavitation plate through the electrical connection.

15. The method of claim 14, further comprising:

forming a plurality of heating components for a plurality of fluidic chambers of the fluidic die;

forming a plurality of cavitation plates to be positioned between respective pairs of fluidic chambers and heating components, wherein each of the plurality of cavitation plates overlaps a respective heating component of the plurality of heating components; and connecting each of the plurality of cavitation plates to respective electrical connections.

* * * * *